(154.)

D'ALEMBERT T. GALE.

Roaster for Nuts.

No. 4,689. Reissued Jan. 2, 1872.

Witnesses.
W. H. Blodgett
John Fretler

Inventor.
D'Alembert T. Gale
per Edw. W. Donn

UNITED STATES PATENT OFFICE.

D'ALEMBERT T. GALE, OF POUGHKEEPSIE, NEW YORK.

IMPROVEMENT IN ROASTERS FOR NUTS.

Specification forming part of Letters Patent No. 81,159, dated August 18, 1868; reissue No. 4,689, dated January 2, 1872.

I, D'ALEMBERT T. GALE, of Poughkeepsie, in the county of Dutchess and State of New York, have invented a new and useful Improvement in Roasters for Nuts, Coffee, &c.; and I do declare the following to be an accurate description thereof, which will enable others skilled in the art to make the same, reference being had to the accompanying drawing.

The object of this invention is to produce a simple and useful apparatus for roasting nuts, coffee, &c., by the use of gas; and, also, the further providing such roaster with a hot-air receiver or counter, for the purpose of keeping roasted nuts hot as a specialty for the retail trade. The roaster consists of a case made of sheet-iron or other suitable metal, in the usual way. It also consists of a hollow cylinder, made of sheet-iron with bearings at each end, in the usual way. It further consists in the providing and applying gas-pipes or tubes in a suitable manner to produce heat from gas or other suitable material that will produce gas at the burner to heat the cylinder, thereby producing an even and superior roast. It further consists in forming a table or counter, or any equivalent receiver of metal, or wood protected with metal, in such a manner as that the nuts may be dumped thereon after being roasted, and kept hot and fresh in all kinds of weather without their roasting any more.

The roaster and the counter may be combined and heated from one retort, or they may be used or heated separate.

To illustrate further I will proceed to state more particularly my manner of constructing said device.

Figure 1:
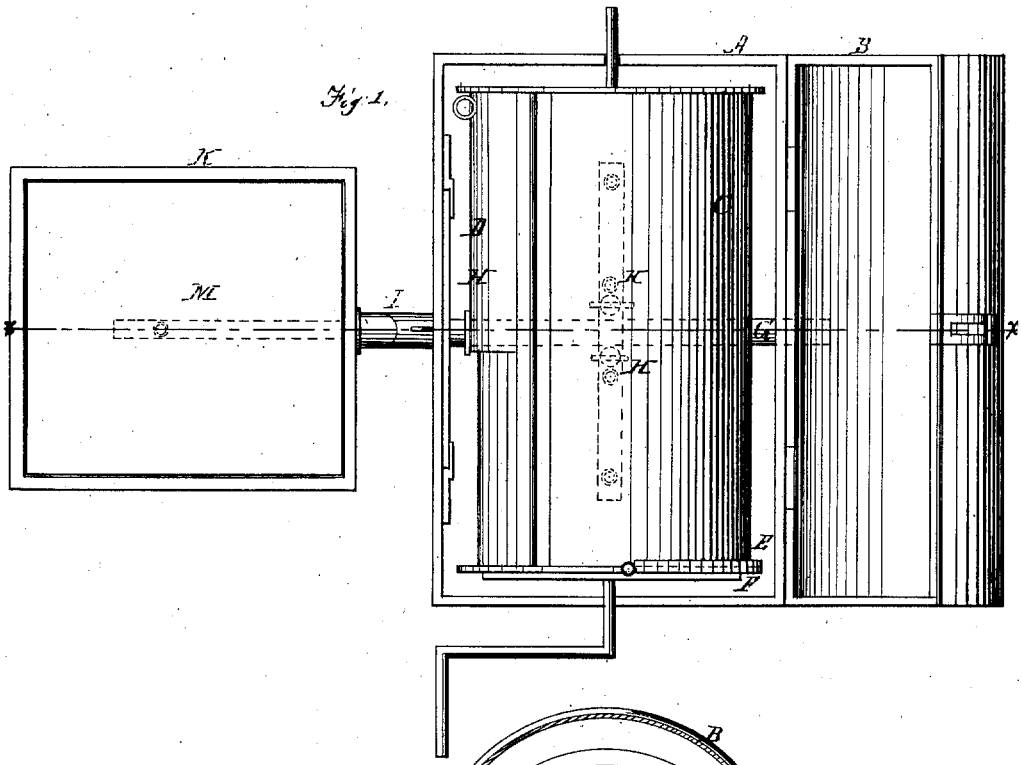
Figure 2:
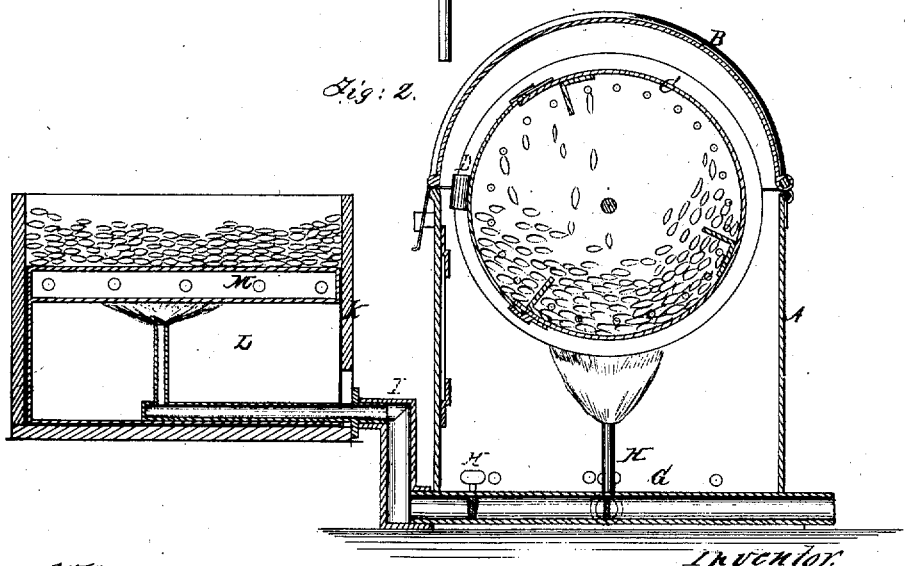

Figure 1 represents a plan view of my roaster with the cover of the roasting-case removed. Fig. 2 represents a cross-section of the same taken on a line, *x x*, Fig. 1.

Similar letters of reference indicate corresponding parts.

A represents a suitable metallic case of turned iron or other material, provided with a hinged cover, B, and with suitable apertures for the admission of air to support combustion. C represents a hollow cylinder, also made of sheet-iron or other suitable material, and arranged to rotate within said case or bearings at each end. Cylinder C is provided with an opening and slide for filling and dumping. Suitably attached to case A are gas-tubes G provided with suitable burners, preferably those that burn air with the gas to make a perfect combustion without smoke, though any suitable burner that will produce heat will answer. The gas-tubes G are also provided with cocks H, for regulating the flow of the heating agent. The warming apparatus K, I make either all of metal, or wood lined with a metal heating-chamber, L. Heating-chamber L is provided with gas-tubes G, and suitable burner for the purpose of generating hot air. The bottom of plate that holds the nuts above the heating chamber L is or may be protected with a shield to divert the direct blaze. Gas-tubes G are provided with regulating-cocks.

It is an important matter with retailers of roasted nuts to preserve them hot after they have been roasted, as by so doing they retain their crispy sweetness in all kinds of weather, and the trade is increased thereby; hence the providing a suitable apparatus to accommodate the retail trade is a desirable adjunct to the same.

The roaster may be supplied with gas from the factory, or with suitable burners the gas may be generated at the burners from any suitable volatile material.

The hot-air counter may be supplied in combination from the same source or any suitable heating agent may be applied to produce the heat in heating-chamber L.

The apparatus may be of various sizes to suit the trade, and by the use of gas for heating them, no smoke or offensive dust or delay from lighting fires of wood or coal is encountered, making a uniform heat.

Having thus described my invention, what I claim as new, and wish to be patented, is—

1. A burner, H, arranged within a roasting-case, A, with relation to a rotating cylinder, C, as shown and described.

2. The hot-air counter or case K L M, constructed substantially as specified.

3. Hot-air counter or case K, with relation to a roaster for nuts, whereby roasted nuts are kept hot for the retail trade, substantially as described and set forth.

4. The combination of a roaster for nuts with a hot-air nut-counter, with the arrangement of case A, cylinder C, gas-pipes G, burners H, hot-air case K, heating-chamber L provided with cocks, whereby heat is applied to C K, simultaneously or alternately, as herein described, and for the purposes set forth.

D'ALEMBERT T. GALE.

Witnesses:

EDWIN T. GALE,

GEO. C. CHICHESTER. (154)